United States Patent Office.

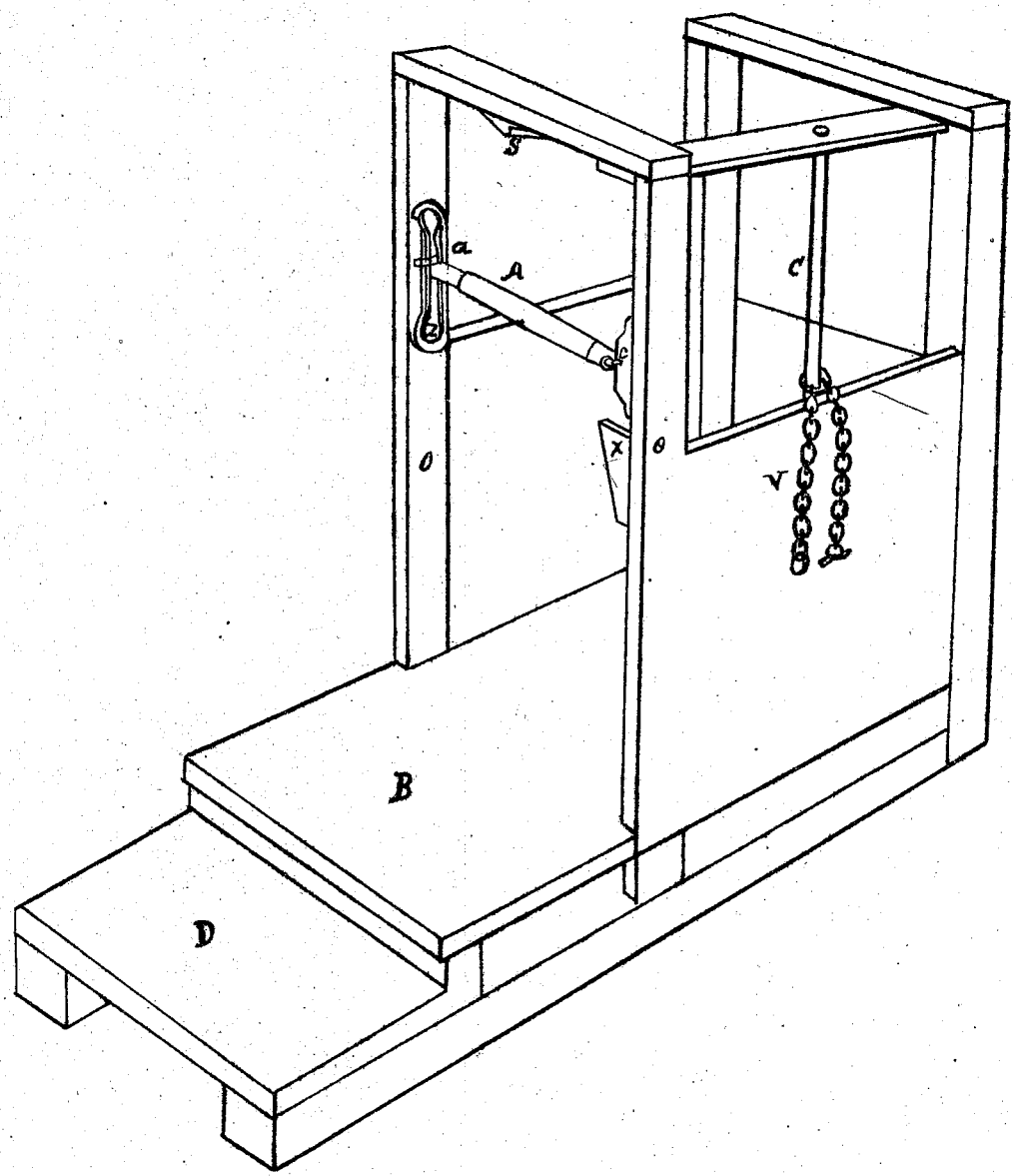

STEPHEN D. STONE, OF WARWICK, RHODE ISLAND.

*Letters Patent No. 75,595, dated March 17, 1868.*

IMPROVEMENT IN CATTLE-STALLS.

*The Schedule referred to in these Letters Patent and making part of the same.*

TO ALL WHOM IT MAY CONCERN:

Be it known that I, STEPHEN D. STONE, of Warwick, in the county of Kent, and State of Rhode Island, have invented a new and useful Improvement in Stalls for Cattle; and I do hereby declare the following to be a full and correct description thereof, reference being had to the accompanying drawings, forming part of this specification, and to the letters of reference marked thereon.

My improvement is for the purpose of keeping the cattle clean while in their stalls, and is more especially adapted and intended for cows; for, on account of milking, it is more important that they should be kept clean.

The drawing is a perspective view of a stall.

$o\ o$ are the stanchions. C is a pole to hold a chain, V, or other fastening for the cow. $x$ is the manger. A is a cross-bar, hinged at one end to the side of the stall, the other end being held by dropping into a slotted piece, $z$, provided with a spring, $a$, to keep it down. Holes are made in the pieces attached to the side of the stall to hold the ends of the bar, so that it may be placed at the proper height for the animal, which should be about one inch clear of its back, and a little ways in front of the middle of the animal.

The operation is as follows: When the cow standing in the stall is about to drop her manure or water, she raises her back, when, coming in contact with the bar A, she will immediately step back till clear of it, and consequently drop her dung and urine beyond the end of the platform B upon the floor D of the stable, thus keeping the litter or bed upon the platform dry and clean to lie on.

This is found to be very efficient in practice, and it is obvious that, for the bar A, a board might be substituted, extending down from the top of the stall.

S is a spring, placed at the top of the stall to catch the end of the bar when released from the spring $a$, and raised to admit the animal into the stall.

Having thus described my improvement, and its operation, what I claim as my invention is this:

I claim placing the bar A, or its equivalent, in the position with regard to the animal in the stall, substantially as herein described, and for the purpose set forth.

S. D. STONE.

Witnesses:
JAMES E. ARNOLD,
BENJAMIN ARNOLD.